United States Patent [19]
Weaver et al.

[11] Patent Number: 5,501,276
[45] Date of Patent: Mar. 26, 1996

[54] DRILLING FLUID AND FILTER CAKE REMOVAL METHODS AND COMPOSITIONS

[75] Inventors: Jim Weaver; Krishna M. Ravi, both of Duncan, Okla.; Larry S. Eoff, Katy, Tex.; Rick Gdanski; J. Michael Wilson, both of Duncan, Okla.

[73] Assignee: Halliburton Company, Duncan, Okla.

[21] Appl. No.: 306,689

[22] Filed: Sep. 15, 1994

[51] Int. Cl.$^6$ ............................. E21B 33/16; E21B 37/00
[52] U.S. Cl. ........................... 166/291; 166/300; 166/312; 507/209; 507/928
[58] Field of Search .................................. 166/291, 300, 166/312; 507/209, 921, 927, 929

[56] References Cited

U.S. PATENT DOCUMENTS

| | | | |
|---|---|---|---|
| 2,221,353 | 11/1940 | Limerick | 166/312 X |
| 3,411,580 | 11/1968 | McKinney et al. | 166/312 X |
| 3,625,286 | 12/1971 | Parker | 166/291 |
| 4,333,530 | 6/1982 | Armstrong | 166/289 |
| 4,681,165 | 7/1987 | Bannister | 166/312 |
| 4,830,766 | 5/1989 | Gallup et al. | 166/300 X |
| 4,946,604 | 8/1990 | Smith | 166/300 X |
| 5,165,477 | 11/1992 | Shell et al. | 166/291 |
| 5,238,065 | 8/1993 | Mondshine et al. | 166/300 |

*Primary Examiner*—George A. Suchfield
*Attorney, Agent, or Firm*—Craig W. Roddy; Robert A. Kent; C. Clark Dougherty, Jr.

[57] ABSTRACT

Methods and compositions for removing gelled and dehydrated drilling fluid and filter cake from the walls of wellbores are provided. The methods basically include contacting the drilling fluid and filter cake with a removal composition comprised of an aqueous sugar solution for a period of time sufficient to cause the disintegration of the drilling fluid and filter cake. The composition, having the disintegrated drilling fluid and filter cake dispersed therein, is then displaced from the wellbore.

16 Claims, No Drawings

DRILLING FLUID AND FILTER CAKE REMOVAL METHODS AND COMPOSITIONS

BACKGROUND OF THE INVENTION

1. Field of the Invention

This invention relates to methods and compositions for removing gelled and dehydrated drilling fluid and filter cake from the walls of wellbores.

2. Description of the Prior Art

A variety of drilling fluids are used in the drilling of wellbores. Generally, the drilling fluids are solids containing water based gels or hydrocarbon based fluids which can be non-weighted or weighted with particulate weighting materials such as barite. Most drilling fluids contain gelled bentonite and/or one or more natural and/or synthetic polymeric additives such as polysaccharides or polysaccharide derivatives. The polymeric additives add viscosity to the fluids and are included to impart sufficient carrying capacity and thixotropy whereby the fluids can transport cuttings to the surface and prevent the cuttings from settling appreciably when circulation is interrupted. Natural and synthetic polymeric fluid loss control additives are also commonly utilized in drilling fluids, e.g., polysaccharides, polysaccharide derivatives, polyacrylic acids, polyvinyl alcohol and the like.

One of the most important functions of a drilling fluid is to seal off the walls of the wellbore so that the fluid is not lost into highly permeable subterranean zones penetrated by the wellbore. This is accomplished by the deposit of a filter cake of solids from the drilling fluid, dehydrated drilling fluid and gelled drilling fluid over the surfaces of the wellbore whereby the solids bridge over the formation pores and do not permanently plug the pores.

During the drilling of a well bore, the drilling fluid is continuously circulated down the drill pipe, through the drill bit and back to the surface through the annulus between the drill pipe and the walls of the wellbore. After a wellbore has been drilled to total depth, the circulation of the drilling fluid is stopped while the well is logged and pipe is run in the wellbore. During the shut down period, additional gelled and dehydrated drilling fluid and filter cake is deposited on the walls of the wellbore. As a result of the polymeric viscosifiers and additives in the drilling fluid, the filter cake formed is generally very stable and difficult to remove.

After pipe is run in the well bore, primary cementing operations are usually performed therein. That is, the pipe is cemented in the wellbore by placing a cement slurry in the annulus between the pipe and the walls of the wellbore. The cement slurry sets into a hard impermeable mass, and it is intended to bond the pipe to the walls of the wellbore whereby the annulus is sealed and fluid communication between subterranean zones or to the surface by way of the annulus is prevented.

In order for the cementing of the pipe in the wellbore to be successful, the gelled and dehydrated drilling fluid and filter cake deposited on the walls of the wellbore must be removed. If appreciable drilling fluid and filter cake remain on the walls of the well bore, the cement will not properly bond thereto and fluid leakage through the annulus and other major problems will result.

Heretofore, attempts have been made to remove the drilling fluid and filter cake from the wellbore by attaching mechanical scrapers to the pipe so that as the pipe is run into the well bore, it physically contacts and breaks up some of the drilling fluid and filter cake. In addition, flushes are normally run through the annulus between the pipe and the walls of the wellbore prior to cementing in order to remove drilling fluid and filter cake therein. Such flushes generally provide only minimal drilling fluid and filter cake removal. Other improvements have achieved better results such as pumping fluids through the annulus at high rates so that they are in turbulence as they contact the filter cake, and including surfactants in flush fluids to lower surface tension and enhance the penetration of the flush fluids into the filter cake.

While the above described methods and other prior art techniques have achieved varying degrees of success, there is a need for improved methods of removing stable polymer-containing filter cake from the walls of a wellbore in a relatively short period of time prior to or as a part of primary cementing operations whereby the filter cake is substantially removed and successful cementing is achieved.

SUMMARY OF THE INVENTION

The present invention provides improved methods and compositions for removing gelled and dehydrated drilling fluid and filter cake from the walls of wellbores which meet the above described need and overcome the shortcomings of the prior art. The methods of the present invention basically comprise the steps of contacting the gelled and dehydrated drilling fluid and filter cake with a removal composition whereby disintegration of the drilling fluid and filter cake results and displacing the composition along with the disintegrated drilling fluid and filter cake from the wellbore.

The removal composition of this invention which brings about the rapid disintegration of stable polymer-containing drilling fluid and filter cake is basically comprised of an aqueous solution of sugar selected from the group consisting of monosaccharide sugars, disaccharide sugars, trisaccharide sugars and mixtures thereof. The composition can also include a surface active agent for promoting the penetration of the drilling fluid and filter cake by the removal composition and the dispersal of drilling fluid and filter cake solids in the composition.

A drilling fluid and filter cake removal composition of this invention is comprised of water and a sugar selected from the group consisting of monosaccharide sugars, disaccharide sugars, trisaccharide sugars and mixtures thereof. As mentioned, a surface active agent can also be included in the composition. Preferred surface active agents are a blend of nonionic ethoxylated alcohols or a mixture of aromatic sulfonates.

It is, therefore, a general object of the present invention to provide improved drilling fluid and filter cake removal methods and compositions.

Other and further objects, features and advantages of the present invention will be readily apparent to those skilled in the art upon a reading of the description of preferred embodiments which follows.

DESCRIPTION OF PREFERRED EMBODIMENTS

This invention is based on the discovery that gelled and dehydrated drilling fluid and filter cake containing gelled bentonite and/or one or more polymers such as polysaccharide polymers can be removed from the walls of a wellbore by contacting the drilling fluid and filter cake with an aqueous sugar solution selected from the group consisting of monosaccharide sugars, disaccharide sugars, trisaccharide sugars and mixtures thereof. Such sugars have high levels of hydrogen bonding, and as a result, are effective in disrupting the hydrogen bonds of polymeric materials which stabilize drilling fluid filter cake. Since the sugars are not themselves polymeric, they break the hydrogen bonding of the polymeric materials and cause the filter cake to disintegrate.

The water used for forming the filter cake removal compositions of this invention can be any water which will dissolve the above described sugars in required amounts, and which will not adversely react therewith or with materials in the wellbore. Fresh water and water containing low levels of salt are preferred. The most preferred water for use in accordance with this invention is fresh water containing from about 0.1% to about saturation of one or more salts which inhibit the swelling and/or dispersion of formation materials, e.g., potassium chloride.

The sugars which can be utilized in accordance with this invention are the non-polymeric low molecular weight monosaccharide sugars (often called simple sugars) composed of chains of 2 to 7 carbon atoms such as glucose and fructose, the disaccharide sugars such as sucrose, lactose, maltose and cellobiose and other low molecular weight non-polymeric sugars, e.g., trisaccharide sugars. Of the various monosaccharide, disaccharide and trisaccharide sugars which can be utilized, lactose is preferred.

The sugar or sugars utilized are dissolved in the water in an amount in the range of from about 0.01% to about 50%, more preferably from about 0.1% to about 20% and most preferably, from about 1% to about 15% by weight of the resulting composition. When lactose is utilized, it is preferably present in the aqueous composition in an amount in the range of from about 2% to about 12% by weight of the composition.

In order to promote the penetration of the drilling fluid and filter cake by the removal composition and to facilitate the dispersal of the drilling fluid and disintegrated filter cake in the composition, a surface active agent is preferably included in the composition. While numerous surface active agents known to those skilled in the art can be utilized beneficially, preferred surface active agents are a blend of nonionic ethoxylated alcohols or a mixture of aromatic sulfonates. Of these, the most preferred surface active agent is a blend of nonionic ethoxylated alcohols. Such a surface active agent is commercially available under the trade designation "PEN-88"™ from Halliburton Energy Services, Duncan, Okla. When a surface active agent is included in a composition of the present invention, it is preferably added to the composition in an amount in the range of from about 0.01% to about 5%, most preferably an amount of from about 0.05% to about 0.5% by weight of the composition.

A particularly preferred polymer-containing drilling fluid and filter cake removal composition of this present invention is comprised of water, lactose present in the composition in an amount of about 10% by weight of the composition and a surface active agent comprising a blend of nonionic ethoxylated alcohols present in the composition in an amount of about 0.25% by weight thereof.

The methods of the present invention for removing gelled and dehydrated drilling fluid and filter cake from the walls of a wellbore are basically comprised of the steps of contacting the drilling fluid and filter cake with a removal composition of this invention for a period of time sufficient to cause the disintegration of the drilling fluid and filter cake, and then displacing the removal composition and the disintegrated drilling fluid and filter cake from the wellbore.

The contact of the drilling fluid and filter cake with the removal composition can be conducted by injecting the removal composition into the wellbore and into contact with the drilling fluid and filter cake therein whereby the filter cake is disintegrated and dispersed in the composition. The contact of the drilling fluid and filter cake with the removal composition can be static, dynamic or intermittently static and dynamic. Preferably, the removal composition is injected into the wellbore at a high rate and circulated therethrough and into contact with the drilling fluid and filter cake therein by the same pumping system utilized to circulate drilling fluid through the wellbore during the drilling thereof. The removal composition can be pumped intermittently and at different rates to enhance the disintegration and dispersion of the drilling fluid and filter cake.

When the methods of the present invention are utilized in association with the cementing of casing or pipe in the well bore, the removal composition is preferably continuously pumped down the casing or pipe and upwardly through the annulus in contact with the filter cake as a preflush just prior to introducing a spacer fluid followed by a cement slurry into the annulus. The quantity of the removal composition pumped through the annulus prior to when the cement slurry is introduced therein is a predetermined quantity calculated to remove substantially all of the gelled and dehydrated drilling fluid and filter cake and thereby insure a successful cementing job.

In order to further illustrate the methods and compositions of the present invention, the following examples are given.

Example 1

Fresh water solutions of lactose and sucrose, various surfactants and mixtures of surfactants and lactose and sucrose were prepared and tested for drilling fluid and filter cake removal capability. The tests were conducted by placing 1 gram portions of filter cake obtained by filtering a lignite mud for 30 minutes on a Fann filter press in 25 milliliter samples of the aqueous solutions and visually observing the results for several minutes. The aqueous solutions tested are identified in Table I below.

TABLE I

Aqueous Solutions Tested

| Solution No. | Sugar Dissolved In The Water | Sugar Amount, % By Weight Of The Resulting Solution | Surfactant Dissolved In The Water | Surfactant Amount, % By Weight Of The Resulting Solution |
| --- | --- | --- | --- | --- |
| 1 | Sucrose | 5 | None | — |
| 2 | Lactose | 5 | None | — |
| 3 | Lactose | 2 | None | — |
| 4 | None | — | Surfactant A[1] | 0.25 |
| 5 | None | — | Surfactant B[2] | 0.25 |
| 6 | None | — | Surfactant C[3] | 0.25 |
| 7 | None | — | Surfactant D[4] | 0.25 |
| 8 | Lactose | 2 | Surfactant A[1] | 0.25 |
| 9 | Lactose | 2 | Surfactant B[2] | 0.25 |
| 10 | None | — | None | — |

[1] A mixture of nonionic ethoxylated alcohols commercially available under the trade designation "SSO-21" ™ from Halliburton Energy Services, Duncan, Oklahoma.
[2] A blend of nonionic ethoxylated alcohols commercially available under the trade designation "PEN-88" ™" from Halliburton Energy Services, Duncan, Oklahoma.
[3] A blend of aromatic sulfonates commercially available under the trade designation "TRI-S" ™ from Halliburton Energy Services, Duncan, Oklahoma.

TABLE I-continued

Aqueous Solutions Tested

| Solution No. | Sugar Dissolved In The Water | Sugar Amount, % By Weight Of The Resulting Solution | Surfactant Dissolved In The Water | Surfactant Amount, % By Weight Of The Resulting Solution |
| --- | --- | --- | --- | --- |

[4]Another blend of aromatic sulfonates commercially available under the trade designation "MORFLO II"™ from Halliburton Energy Services, Duncan, Oklahoma.

The test results indicated that Solutions Nos. 1, 2, 3, 8, 9 and 10 all caused about the same degree of filter cake disintegration, but Solution No. 9 (Lactose and Surfactant B) produced finer particles and appeared to suspend more solids. The solutions containing sugar caused the disintegration of the filter cake faster than water and the solutions containing surfactant alone. Of the solutions containing surfactant alone, the solution containing surfactant B (a blend of nonionic ethoxylated alcohols) produced the best disintegration result.

Example 2

0.5 gram portions of the filter cake described in Example 1 were placed in 5 milliliter quantities of fresh water, a 5% by weight fresh water solution of lactose and a 10% by weight fresh water solution of lactose. The times for the water and lactose solutions to reach turbidity levels such that black grids could not be seen through the water and solutions were noted. A 0.25 inch magnetic stir bar was used to provide gentle agitation to help suspend the solids, but the stir bar was not allowed to be in close proximity to the filter cake sample. The increase in turbidity is proportional to the rate of disintegration of the filter cake. The results of these tests are given in Table II below.

TABLE II

Disintegration Tests

| Aqueous Fluid Tested | Time to Reach Turbidity Level,[1] minutes |
| --- | --- |
| Fresh Water | 6 |
| 5% by Weight Lactose Solution | 4.3 |
| 10% by Weight Lactose Solution | 2 |

[1]Turbidity level such that black grid not visible through fluid.

From Table II, it can be seen that a 10% by weight aqueous solution of lactose is effective in disintegrating filter cake.

Example 3

Samples of the lignite mud filter cake described in Example 1 were observed using a low power optical microscope. To the samples were added drops of fresh water and 2% by weight fresh water solutions of lactose, surfactant A identified in footnote 1 of Table I above and surfactant B identified in footnote 2 of Table I above. The results of these tests are given in Table III below.

TABLE III

Observations of Filter Cake Disintegration

| Aqueous Fluid Tested | Observation |
| --- | --- |
| Fresh Water | Very slowly attacked filter cake with fairly large chunks sloughing off. |
| 2% by weight Lactose Solution | Large chunks sloughed off rapidly; fissures opened on surface of filter cake. |
| 2% by weight Surfactant B Solution | Fine, grainy particles formed over the surface which then sloughed off. No fissures were observed. |
| 2% by weight Surfactant A Solution | Same as Surfactant B solution, but slower. |

From Table III, it can be seen that the removal compositions of this invention are effective in bringing about the disintegration of filter cake.

Example 4

A 24" inch wellbore is drilled from the surface to a total depth of 3000 feet. When drilling is stopped, the wellbore contains a 3000 foot column of a water base drilling fluid basically comprised of water, bentonite gel and other conventional additives as well as filter cake, dehydrated drilling fluid and gelled drilling fluid deposited on the walls of the wellbore adjacent permeable formations or zones penetrated by the wellbore.

The well is logged and casing is run in the wellbore over a time period of 10 hours during which additional filter cake, dehydrated drilling fluid and gelled drilling fluid are deposited on the walls of the wellbore.

Prior to cementing the casing in the well bore, 200 barrels of a flush fluid comprised of a 10% by weight fresh water solution of lactose is circulated at a 16 bbl/min rate through the annulus to remove the gelled and dehydrated drilling fluid and filter cake from the walls of the wellbore.

After the flush fluid is pumped into and through the annulus, a spacer fluid followed by a hydraulic cement slurry is pumped therein whereby flush fluid containing disintegrated drilling fluid and filter cake remaining in the annulus is displaced therefrom, and the annulus which is substantially free of drilling fluid and filter cake is filled with the cement slurry. The cement slurry is allowed to set whereby the casing is bonded to the walls of the wellbore and the annulus is sealed.

Thus, the present invention is well adapted to carry out the objects and attain the ends and advantages mentioned as well as those which are inherent therein. While numerous changes in the construction and arrangement of parts may be made by those skilled in the art, such changes are encompassed within the spirit of this invention as defined by the appended claims.

What is claimed is:

1. A method of removing gelled and dehydrated drilling fluid and filter cake from the walls of a wellbore comprising:

contacting said drilling fluid and filter cake with a removal composition for a period of time sufficient to cause the disintegration of said drilling fluid and filter cake, said composition being comprised of an aqueous solution of sugar selected from the group consisting of monosaccharide sugars, disaccharide sugars, trisaccharide sugars and mixtures thereof; and displacing said removal composition and disintegrated drilling fluid and filter cake from said wellbore.

2. The method of claim 1 wherein said sugar is present in said removal composition in an amount in the range of from about 0.01% to about 50% by weight of said composition.

3. The method of claim 1 wherein said sugar is lactose present in said composition in an amount in the range of about 2% to about 12% by weight of said composition.

4. The method of claim 1 wherein said removal composition further comprises a surface active agent present therein selected from the group consisting of a blend of nonionic ethoxylated alcohols and a mixture of aromatic sulfonates.

5. The method of claim 4 wherein said sugar is present in said composition in an amount in the range of from about 0.1% to about 20% by weight of said composition and said surface active agent is present in an amount in the range of from about 0.05% to about 0.5% by weight of said composition.

6. The method of claim 4 wherein said sugar is lactose present in an amount of about 10% by weight of said composition.

7. The method of claim 1 wherein said removal composition further comprises a surface active agent consisting of a blend of nonionic ethyoxylated alcohols present in anamount of about 0.25% by weight of said composition.

8. A method of removing gelled and dehydrated drilling fluid and filter cake from the walls of a wellbore comprising displacing a removal composition through said wellbore in contact with said drilling fluid and filter cake whereby said drilling fluid and filter cake is disintegrated, dispersed in said removal composition and removed from said wellbore therewith, said removal composition being comprised of water and at least one sugar selected from the group consisting of monosaccharide sugars, disaccharide sugars, trisaccharide sugars and mixtures thereof.

9. The method of claim 8 wherein said sugar is present in an amount in the range of from about 0.01% to about 50% by weight of said composition.

10. The method of claim 8 wherein said water is selected from the group consisting of fresh water and salt water.

11. The method of claim 8 wherein said drilling fluid and filter cake removal composition is circulated through said wellbore just prior to introducing a spacer fluid followed by a hydraulic cement slurry therein.

12. The method of claim 8 wherein said sugar is lactose present in said composition in an amount in the range of about 2% to about 12% by weight of said composition.

13. The method of claim 8 wherein said composition further comprises a surface active agent in said composition selected from the group consisting of a blend of nonionic ethoxylated alcohols and a mixture of aromatic sulfonates.

14. The method of claim 13 wherein said sugar is present in said composition in an amount in the range of from about 0.1% to about 20% by weight thereof and said surface active agent is present in said composition in an amount in the range of from about 0.05% to about 0.5% by weight thereof.

15. The method of claim 13 wherein said sugar is lactose present in an amount of about 10% by weight of said composition.

16. The method of claim 8 wherein said composition further comprises a surface active agent consisting of a blend of nonionic ethoxylated alcohols prevent in said composition in an amount of about 0.25% by weight thereof.

\* \* \* \* \*